(12) United States Patent
Kalitzin et al.

(10) Patent No.: US 10,563,513 B2
(45) Date of Patent: Feb. 18, 2020

(54) VARIABLE INLET GUIDE VANE

(71) Applicant: United Technologies Corporation, Farmington, CT (US)

(72) Inventors: Georgi Kalitzin, West Hartford, CT (US); Gorazd Medic, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 202 days.

(21) Appl. No.: 15/847,371

(22) Filed: Dec. 19, 2017

(65) Prior Publication Data

US 2019/0186501 A1 Jun. 20, 2019

(51) Int. Cl.

| F01D 5/14 | (2006.01) |
| F04D 29/56 | (2006.01) |
| F01D 17/16 | (2006.01) |
| F01D 9/04 | (2006.01) |
| F04D 29/54 | (2006.01) |

(52) U.S. Cl.
CPC ............. *F01D 5/141* (2013.01); *F01D 5/146* (2013.01); *F01D 5/147* (2013.01); *F01D 5/148* (2013.01); *F01D 9/041* (2013.01); *F01D 17/162* (2013.01); *F04D 29/544* (2013.01); *F04D 29/563* (2013.01); *F05D 2220/32* (2013.01); *F05D 2240/12* (2013.01); *F05D 2250/70* (2013.01)

(58) Field of Classification Search
CPC .......... F01D 5/141; F01D 5/146; F01D 5/147; F01D 5/148; F01D 9/041; F01D 17/16; F01D 17/162; F04D 29/544; F04D 29/563; F05D 2220/32; F05D 2240/12; F05D 2250/70
See application file for complete search history.

(56) References Cited

U.S. PATENT DOCUMENTS

| 3,873,229 | A | 3/1975 | Mikolajczak et al. |
| 6,543,997 | B2 | 4/2003 | Donnaruma et al. |
| 8,573,941 | B2 | 11/2013 | Hoeger |
| 8,864,454 | B2 | 10/2014 | Hofer et al. |
| 9,242,721 | B2 | 1/2016 | Neuteboom |
| 2008/0317587 | A1* | 12/2008 | Lord ................ F01D 5/146 415/160 |
| 2014/0064955 | A1* | 3/2014 | Senter ............... F01D 9/042 415/209.3 |
| 2015/0086339 | A1* | 3/2015 | Orosa ............... F01D 17/143 415/148 |
| 2015/0361819 | A1* | 12/2015 | Epstein ............. F01D 9/041 415/1 |
| 2016/0084265 | A1 | 3/2016 | Yu et al. |
| 2017/0284308 | A1 | 10/2017 | Myoren et al. |
| 2019/0078450 | A1* | 3/2019 | Eley ................. F01D 9/041 |

* cited by examiner

*Primary Examiner* — David E Sosnowski
*Assistant Examiner* — Sang K Kim
(74) *Attorney, Agent, or Firm* — Snell & Wilmer, L.L.P.

(57) ABSTRACT

An inlet guide vane is disclosed. The inlet guide vane includes a strut and a flap having a radial length in a radial direction. The flap includes a radially inner portion having a first angular orientation with respect to the strut, a radially outer portion having a second angular orientation with respect to the strut, and a transition portion intermediate the radially inner portion and the radially outer portion, wherein the first angular orientation transitions to the second angular orientation along a portion of the radial length.

19 Claims, 6 Drawing Sheets

VARIABLE INLET GUIDE VANE

GOVERNMENT LICENSE RIGHTS

This disclosure was made with government support under contract FA8650-15-D-2502/0002, awarded by the United Stated Air Force. The government has certain rights in the disclosure.

FIELD

The present disclosure relates generally to blade componentry used in fan or compressor stages for use in gas turbine engines and, more particularly, to inlet guide vane componentry having features designed to reduce the strength of shock waves generated at supersonic blade speeds within fan or compressor stages.

BACKGROUND

Gas turbine engines typically include a fan section, a compressor section, a combustor section and a turbine section. During operation, air is pressurized in the compressor section and mixed with fuel and burned in the combustor section to generate hot combustion gases. The hot combustion gases are communicated through the turbine section, which extracts energy from the hot combustion gases to power the compressor section and the fan section. One or more sections of the gas turbine engine may include a plurality of vane assemblies having vanes interspersed between rotor or fan assemblies that carry the blades of successive stages of the section.

Some gas turbine engines are designed to propel aircraft at supersonic or near supersonic velocities at various altitudes. The relative velocities of the blades within the fan or compressor sections required to propel aircraft at supersonic or near supersonic velocities may generate shock waves, particularly near the outer radial portions of the blades. When such shock waves are introduced into the surrounding flow field, undesirable efficiency depleting losses within the engine may result.

Contributors to decreased efficiency generally include wall friction, tip clearance vortices, hub-corner roll-up and shock waves. When operating at supersonic speeds, shock wave/boundary layer interactions may induce separation at the outer radial spans of the rotor blades, leading to a relatively large reduction in efficiency. In addition, interaction between tip vortices and the supersonic flow create complicated shock structures between adjacent rotor blades, further reducing efficiency. These shock wave related phenomena may dominate efficiency reduction in supersonic flows by reducing the effective aerodynamic throat area between adjacent blades, thereby limiting the mass flow through the rotor. Reduction of efficiency depleting losses in the supersonic flow region of rotors in the fan and compressor stages, thereby increasing the mass flow through these sections as well as the entire compressor, is desirable. This can be achieved, according to various embodiments of the below disclosure, by controlling the shape of inlet vanes that guide flow into rotors experiencing regions of supersonic flow.

SUMMARY

An inlet guide vane for a gas turbine engine is disclosed. The inlet guide vane includes a strut and a flap. In various embodiments, the flap includes a radially inner portion having a first angular orientation with respect to the strut, a radially outer portion having a second angular orientation with respect to the strut, and a transition portion intermediate the radially inner portion and the radially outer portion, where the first angular orientation transitions to the second angular orientation along a portion of a radial length of the inlet guide vane.

In various embodiments, the radially inner portion may have a radially inner length in the radial direction ranging from about 20% to about 50% of the radial length of the flap. The radially outer portion may have a radially outer length in the radial direction ranging from about 20% to about 50% of the radial length of the flap. The transition portion may have a transition length in the radial direction ranging from about 5% to about 30% of the radial length of the flap. In various embodiments, the first angular orientation defines an angle ranging from about 0 degrees to about 45 degrees with respect to a longitudinal reference and the second angular orientation defines an angle ranging from about 0 degrees to about 45 degrees with respect to the longitudinal reference.

In various embodiments, the first angular orientation defines an angle ranging from about 10 degrees to about 20 degrees with respect to the longitudinal reference and the second angular orientation defines an angle ranging from about 0 degrees to about 10 degrees with respect to the longitudinal reference. In various embodiments, the first angular orientation may be defined as an average angle of attack of an inner chord along the radially inner length with respect to the longitudinal reference and the second angular orientation may be defined as an average angle of attack of an outer chord along the radially outer length with respect to the longitudinal reference.

In various embodiments, the flap is configured to pivot with respect to the strut. In various embodiments, the flap and the strut comprise a unitary member configured to pivot in unison with respect to an oncoming air flow.

A fan section of a gas turbine engine is disclosed. In various embodiments, the fan section includes a first rotor having a plurality of rotor blades, a first stator having a plurality of vanes and positioned downstream of the first rotor and a fan inlet guide vane positioned upstream of the first rotor. In various embodiments, the fan inlet guide vane includes a strut and a flap having a radial length in a radial direction. The flap may include a radially inner portion having a first angular orientation with respect to the strut, a radially outer portion having a second angular orientation with respect to the strut, and a transition portion intermediate the radially inner portion and the radially outer portion, where the first angular orientation transitions to the second angular orientation along a portion of the radial length.

In various embodiments, the radially inner portion may have a radially inner length in the radial direction ranging from about 20% to about 50% of the radial length of the flap. The radially outer portion may have a radially outer length in the radial direction ranging from about 20% to about 50% of the radial length of the flap. The transition portion may have a transition length in the radial direction ranging from about 5% to about 30% of the radial length of the flap. In various embodiments, the inlet guide vane may include a longitudinal reference, the first angular orientation may define an angle ranging from about 10 degrees to about 20 degrees with respect to the longitudinal reference and the second angular orientation may define an angle ranging from about 0 degrees to about 10 degrees with respect to the longitudinal reference. In various embodiments, the first angular orientation may be defined as an average angle of attack of an inner chord along the radially inner length with respect to the longitudinal reference and the second angular orientation may be defined as an average angle of attack of an outer chord along the radially outer length with respect to the longitudinal reference.

In various embodiments, the fan section my include a second rotor having a second plurality of rotor blades, positioned downstream of the first stator, and a second stator having a second plurality of vanes and positioned downstream of the second rotor. In various embodiments, the fan section may include a second fan inlet guide vane having a second strut and a second flap having a radial length in a radial direction. The second flap may include a radially inner portion having a first angular orientation with respect to the strut, a radially outer portion having a second angular orientation with respect to the second strut, and a transition portion intermediate the radially inner portion and the radially outer portion, where the first angular orientation transitions to the second angular orientation along a portion of the radial length.

A gas turbine engine is disclosed. In various embodiments, the gas turbine engine includes a fan section having a first fan rotor with a plurality of rotor blades, a first fan stator with a plurality of vanes and positioned downstream of the first fan rotor, and a fan inlet guide vane positioned upstream of the first fan rotor. The fan inlet guide vane may include a strut and a flap having a radial length in a radial direction. The flap may include a radially inner portion having a first angular orientation with respect to the strut, a radially outer portion having a second angular orientation with respect to the strut, and a transition portion intermediate the radially inner portion and the radially outer portion, where the first angular orientation transitions to the second angular orientation along a portion of the radial length. The gas turbine engine also includes a compressor section having a first compressor rotor with a plurality of rotor blades, a first compressor stator with a plurality of vanes and positioned downstream of the first compressor rotor, and a compressor inlet guide vane positioned upstream of the first compressor rotor. The compressor inlet guide vane may include a strut and a flap having a radial length in a radial direction. The flap may include a radially inner portion having a first angular orientation with respect to the strut, a radially outer portion having a second angular orientation with respect to the strut, and a transition portion intermediate the radially inner portion and the radially outer portion, where the first angular orientation transitions to the second angular orientation along a portion of the radial length.

In various embodiments, the fan inlet guide vane includes a fan longitudinal reference, the first angular orientation of the fan inlet guide vane defines an angle ranging from about 10 degrees to about 20 degrees with respect to the fan longitudinal reference and the second angular orientation of the fan inlet guide vane defines an angle ranging from about 0 degrees to about 10 degrees with respect to the fan longitudinal reference. In various embodiments, the compressor inlet guide vane includes a compressor longitudinal reference, the first angular orientation of the compressor inlet guide vane defines an angle ranging from about 10 degrees to about 20 degrees with respect to the compressor longitudinal reference and the second angular orientation of the compressor inlet guide vane defines an angle ranging from about 0 degrees to about 10 degrees with respect to the compressor longitudinal reference.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
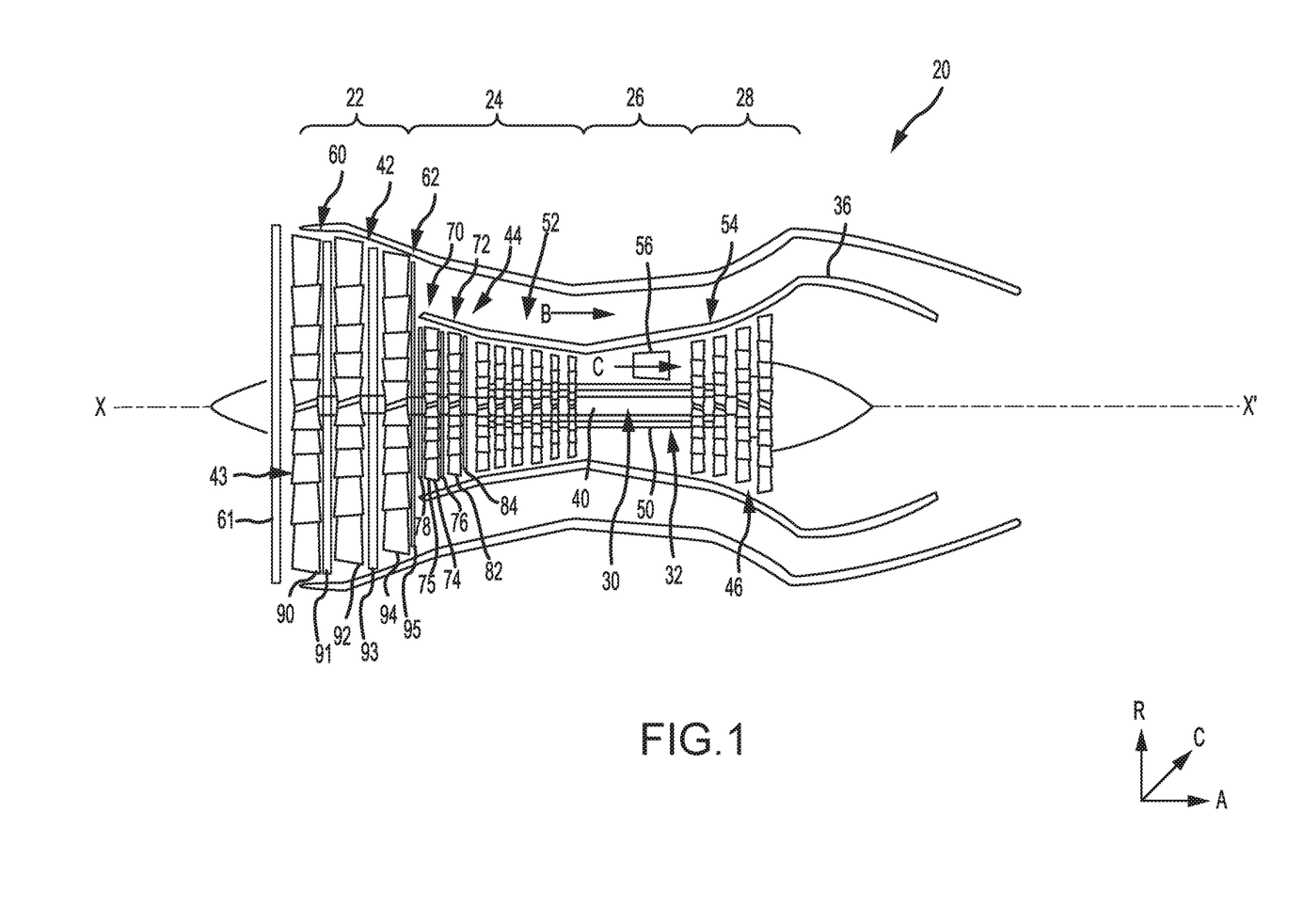
FIG. 1 provides a schematic view of a gas turbine engine, in accordance with various embodiments.

Referring now to die drawings, FIG. 1 schematically illustrates a gas turbine engine 20. As used herein, "aft" refers to the direction associated with the tail (e.g., the back end) of an aircraft or, generally, to the direction of exhaust of the gas turbine engine 20. On the other hand, "forward" refers to the direction associated with the nose (e.g., the front end) of an aircraft or, generally, to the direction of flight or motion. "Radially inward" refers to a direction of decreasing radius along the R axis, while radially outward refers to an increasing radius along the R axis. The A-R-C coordinate system is shown in the drawings to illustrate relative positions of various components in the aft, radial and circumferential directions.

The gas turbine engine 20 may be a two-spool turbofan that generally incorporates a fan section 22, a compressor section 24, a combustor section 26 and a turbine section 28. Alternative engines include an augmentor section among other systems or features. In operation, the fan section 22 drives air along a bypass flow-path B while the compressor section 24 drives air along a core flow-path C for compression and communication into the combustor section 26, followed by expansion through the turbine section 28. Although the gas turbine engine 20 is depicted as a turbofan, it should be understood that the concepts described herein are not limited to use with turbofans as the teachings may be applied to other types of turbine engines, including multi-spool architectures and turboshaft or industrial gas turbines engines.

The gas turbine engine 20 may generally comprise a low speed spool 30 and a high speed spool 32 mounted for rotation about a central axis X-X' running longitudinally relative to an engine static structure 36. The low speed spool 30 generally includes an inner shaft 40 that interconnects a first rotor 90 of a first fan stage 60, a second rotor 92 of a second fan stage 42, a third rotor 94 of a third fan stage 62, a first or low pressure compressor 44 and a first or low pressure turbine 46. The high speed spool 32 includes an outer shaft 50 that interconnects a second or high pressure compressor 52 and a second or high pressure turbine 54. A combustor 56 is located between the high pressure compressor 52 and the high pressure turbine 54. The inner shaft 40 and the outer shaft 50 are concentric and rotate about the central axis X-X', which is collinear with their longitudinal axes. The core airflow C is compressed by the low pressure compressor 44 and then the high pressure compressor 52, mixed and burned with fuel in the combustor 56, and then expanded over the high pressure turbine 54 and then the low pressure turbine 46. The low pressure turbine 46 and the high pressure turbine 54 rotationally drive the respective low speed spool 30 and high speed spool 32 in response to the expansion.

The fan section 22 may be referred to as a three-stage fan, as it includes a first fan stage 60, a second fan stage 42 and a third fan stage 62, each having a rotor and a corresponding stator. For example, the first fan stage 60 includes the first rotor 90 and a first stator 91. The fan section 22 further includes a fan inlet variable vane 61 that conditions the airflow prior to receipt by the first fan stage 60. The first rotor 90 includes a plurality of fan blades 43. The first rotor 90, a second rotor 92 and a third rotor 94 are designed to rotate about the central axis X-X' at a rotational speed that corresponds to the rotational speed of the low speed spool 30. The corresponding first stator 91, second stator 93 and third stator 95, along with the fan inlet variable vane 61, remain stationary relative to the central axis X-X'.

In similar fashion, the low pressure compressor 44 and the high pressure compressor 52 may be referred to as a multi-stage compressor sections. The low pressure compressor 44, for example, may include a first compressor stage 70 and a second compressor stage 72, each having a rotor and a corresponding stator. For example, the first compressor stage 70 may include a first rotor 74 and a first stator 76, while the second compressor stage 72 may include a second rotor 82 and a second stator 84. The low pressure compressor 44 may further include a compressor inlet variable vane 78 that conditions the airflow prior to receipt by the first compressor stage 70. The first rotor 74 includes a plurality of rotor blades 75. The first rotor 74 and the second rotor 82 are designed to rotate about the central axis X-X' at a rotational speed that corresponds to the rotational speed of the low speed spool 30. The corresponding first stator 76 and second stator 84, along with the compressor inlet variable vane 78, remain stationary relative to the central axis X-X'.

Figure 2:
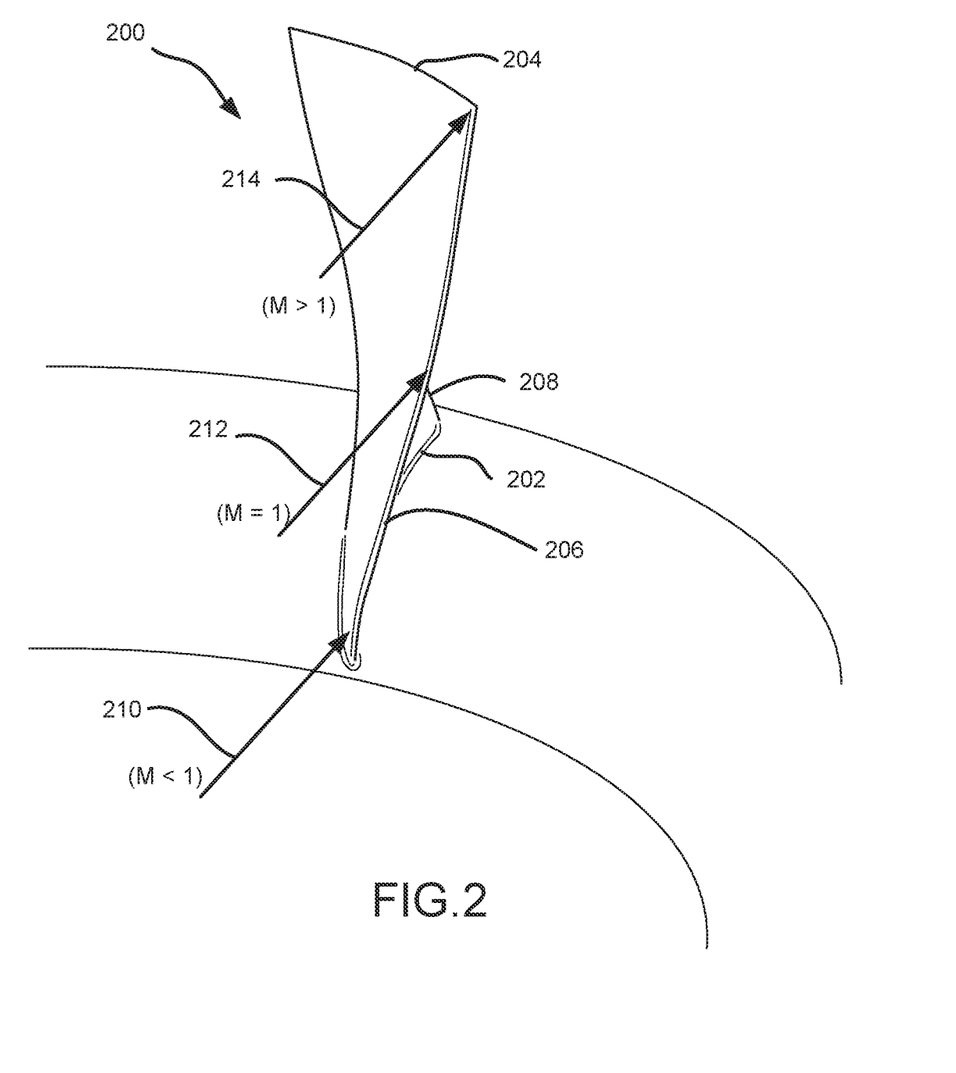
FIG. 2 provides a schematic view of a rotor blade, according to various embodiments.

Referring now to FIG. 2, a fan blade 200 is illustrated, such as one of the fan blades 43 of the first rotor 90 of the first fan stage 60 referred to in FIG. 1. The fan blade 200 includes a base 202, a tip 204, a leading edge 206 and a trailing edge 208. In various situations, the relative velocity crossing the leading edge 206 of the fan blade 200 may be subsonic (M<1) in a radially inner region 210, sonic (M=1) in a radially intermediate region 212 and supersonic (M>1) in a radially outer region 214, with the Mach number in the supersonic or radially outer region 214 approaching M=2. The increasing Mach number with increasing radial distance along the length of the fan blade 200 results from the increasing relative velocity of the air with respect to the fan blade 200 at greater radial distances. In various situations, the relative velocity crossing the leading edge 206 of the fan blade 200 may be subsonic (M<1) throughout of supersonic (M>1) throughout. In various situations, subsequent downstream fan blades, such as those positioned on the second rotor 92 and the third rotor 94 referred to in FIG. 1, may also experience shock waves due to supersonic flows about a region of the blades.

The foregoing discussion regarding the variation of Mach number along the radial length of the fan blade 200 applies also to rotor blades in a compressor section, such as the rotor blades 75 on the first rotor 74 of the first compressor stage 70 described above. In this regard, while the discussion that follows applies generally to the fan section 22, the discussion is equally applicable to the compressor section 24, including the low pressure compressor 44 and the high pressure compressor 52 as well as to any other compression device having rotor blades within the gas turbine engine 20.

Figure 3:
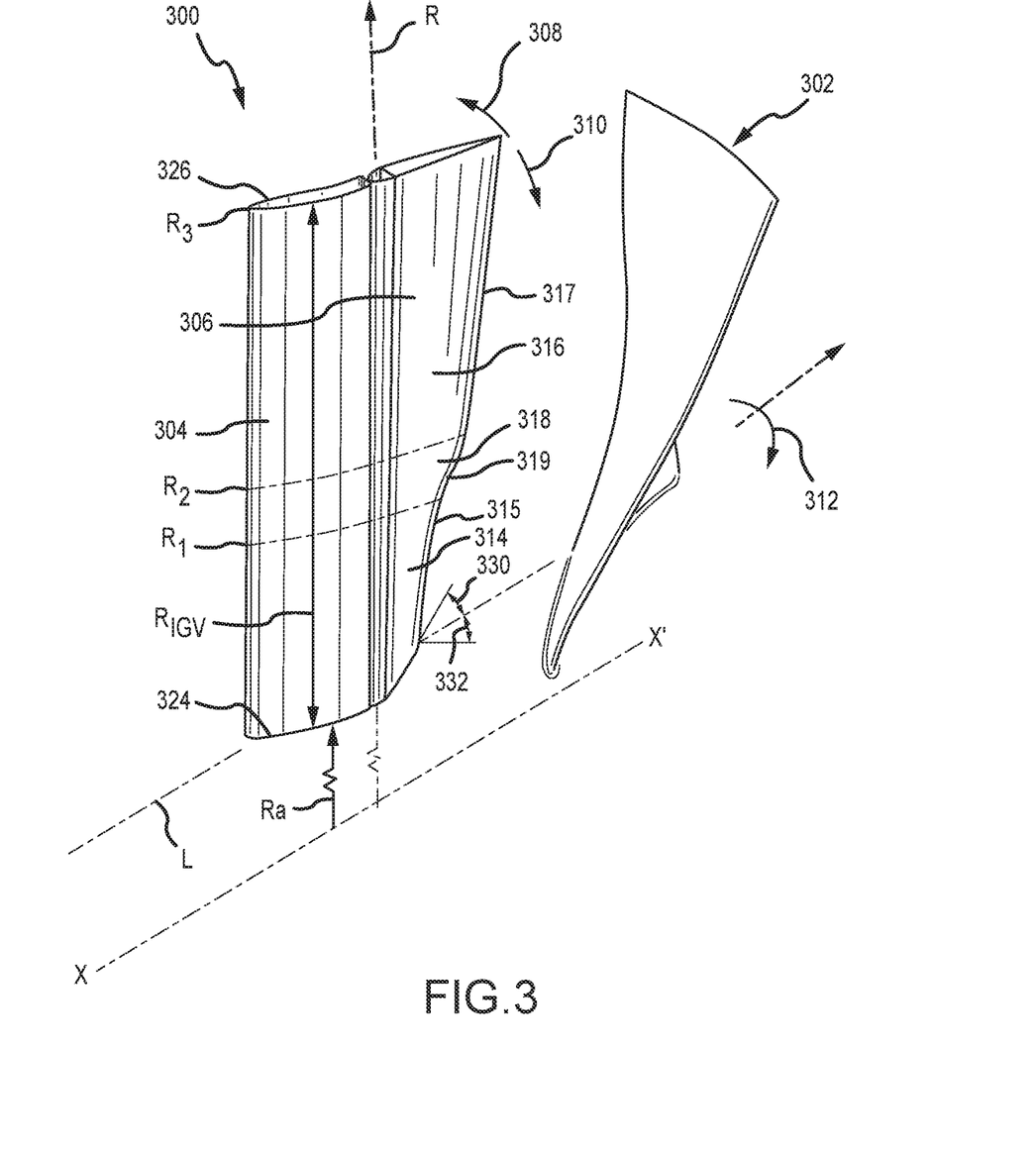
FIG. 3 provides a schematic view of a fan inlet guide vane and a rotor blade, according to various embodiments.

Referring now to FIG. 3, a fan inlet guide vane 300 is illustrated according to various embodiments. The fan inlet guide vane 300 is illustrated positioned adjacent a fan blade 302, similar to the fan blade 200 discussed above with reference to FIG. 2. In various embodiments, the fan inlet guide vane 300 includes a strut 304 and a flap 306. The flap 306 is pivotally mounted to or adjacent the strut 304, which facilitates different configurations of the fan inlet guide vane 300 during different operational parameters, such as engine speed, for example. In various embodiments, the flap 306 is fixedly mounted to the strut 304 and constrained from moving or pivoting with respect to the strut 304, while both components may, however, move or pivot in unison as a unitary member with respect to the oncoming air flow or the fan blade 302.

In various embodiments, the flap 306 pivots in both a first or counterclockwise direction 308 and a second or clockwise direction 310. The fan blade 302 rotates in a clockwise direction 312 with respect to a central axis X-X'. In various embodiments, a longitudinal line L, which may be parallel to the central axis X-X', may provide a longitudinal reference for describing the features of the fan inlet guide vane. For the configuration illustrated in FIG. 3, pivoting the flap 306 in the counterclockwise direction 308 tends to increase the flow of air impinging upon the fan blade 302 by opening the flow region upstream of the fan blade 302, while pivoting the flap 306 in the clockwise direction 310 tends to decrease the flow of air impinging upon the fan blade 302 by closing the flow region upstream of the fan blade 302. Decreasing the flow of air impinging upon the fan blade 302 may reduce the strength of the shock structure resulting from supersonic flow past the fan blade 302, thereby reducing or eliminating the adverse effects of shock induced separation at the boundary layers on the surfaces of the fan blade or adjacent fan blades. In various embodiments, decreasing the flow of air impinging upon the fan blade 302 will reduce the relative velocity of air impinging upon the fan blade 302 to subsonic, thereby eliminating the shock structure all together; excepting, in certain situations, regions of transonic flow on the surface of the fan blade 302 where weak shock waves may be present.

Still referring to FIG. 3, in various embodiments, the flap 306 includes a radially inner portion 314, a radially outer portion 316 and a transition portion 318. The radially inner portion 314 includes a radially inner trailing edge 315, the radially outer portion 316 includes a radially outer trailing edge 317 and the transition portion 318 includes a transition trailing edge 319. In various embodiments, the radially outer trailing edge 317 is oriented more toward the counterclockwise direction 308, while the radially inner trailing edge 315 is oriented more toward the clockwise direction 310, relative to each other. As described below, the change between the two orientations occurs primarily within the transition portion 318. The above described configuration has the effect of maintaining a more open flow region at the radially inner portion 314 and a less open flow region at the radially outer portion 316. In situations where the flow of air impinging upon the fan blade 302 results in relative velocities where M<1 inside the radially inner portion 314 and M>1 inside the radially outer portion 316, the flow of air impinging upon the fan blade 302 may be tailored or controlled by the flap 306 such that the adverse effects of a supersonic relative air stream impinging upon the fan blade 302 at the radially outer portion 316 are reduced or eliminated. Stated otherwise, the flow of air impinging upon the radially outer portion 316 of the fan blade 302 may be reduced while the flow of air impinging upon the radially inner portion 314 of the fan blade 302 is maintained in a full or open state.

In various embodiments, the flap 306 may be configured such that the radially inner portion 314, the radially outer portion 316 and the transition portion 318 are characterized with respect to a radial length $R_{IGV}$ of the fan inlet guide vane 300 and a base radius $R_0$ extending from the central axis X-X' to a base 324 of the fan inlet guide vane 300. The radially inner portion 314 may extend from the base radius $R_0$ to a first radius $R_1$, where the transition portion 318 begins. The radially outer portion 316 may extend from a second radius $R_2$, where the transition portion 318 ends, to a third radius $R_3$, located at a tip 326 of the fan inlet guide vane 300. Each of the radii extend from the central axis X-X' to the indicated location on the inlet guide vane. In various embodiments, the radially inner portion 314 has a non-dimensional radial length $(R_1-R_0)/R_{IGV}$ ranging from about 0.2 to about 0.5, or from about 20% to about 50% of the radial length $R_{IGV}$. In various embodiments, the radially outer portion 316 has a non-dimensional radial length $(R_3-R_2)/R_{IGV}$ ranging from about 0.2 to about 0.5, or from about 20% to about 50% of the radial length $R_{IGV}$.

In various embodiments, the transition portion 318 of the fan inlet guide vane 300 provides a radially extending region, intermediate the radially inner portion 314 and the radially outer portion 316, where an inner angular orientation 330 of the radially inner portion 314 transitions to an outer angular orientation 332 of the radially outer portion 316. In various embodiments, the inner angular orientation 330 may be defined by an average angle of attack of the chord along the radially inner portion 314 with respect to the longitudinal line L, while the outer angular orientation 332 may be defined by an average angle of attack of the chord along the radially outer portion 316 with respect to the longitudinal line L. The average angles of attack may be determined using suitable methods, such as using a mean value of several angles of attack measured along the length of the respective chord. In further embodiments, the inner angular orientation 330 may be defined by an angle of attack of the chord at the center (e.g., at $(R_1+R_0)/2$) of the radially inner portion 314 with respect to the longitudinal line L, while the outer angular orientation 332 may be defined by an angle of attack of the chord at the center (e.g., at $(R_3+R_2)/2$) of the radially outer portion 316 with respect to the longitudinal line L. The definitions takes into account embodiments where the angle of attack of the chord within both the radially inner portion 314 and the radially outer portion 316 may change along the radial lengths of the respective portions, but the extent of such change, in various embodiments, will generally be less than the extent of the change occurring within the transition portion 318.

In various embodiments, the transition portion 318 has a non-dimensional radial length $(R_2-R_1)/R_{IGV}$ ranging from about 0.05 to about 0.3, or from about 5% to about 30% of the radial length $R_{IGV}$. In various embodiments, the inner angular orientation 330 may range from about 0 degrees to about 45 degrees while the outer angular orientation 332 may range from about 0 degrees to about 45 degrees, where the 0 degree orientation for both is an imaginary line separating the orientations, such as the central axis X-X' or the longitudinal line L. In various embodiments, the inner angular orientation 330 may range from about 0 degrees to about 20 degrees and the outer angular orientation 332 may range from about 0 degrees to about −10 degrees, the negative value of the outer angular orientation 332 meaning both the radially inner portion 314 and the radially outer portion 316 lie on the same side of the longitudinal axis L (e.g., both the radially inner portion 314 and the radially outer portion 316 are rotated in a counterclockwise direction 308 with respect to the longitudinal axis L). In various embodiments, the inner angular orientation 330 may range from about 14 degrees to about 15 degrees and the outer angular orientation 332 may range from about −5 degrees to about −7 degrees, with respect to the longitudinal axis L. In various embodiments, the inner angular orientation 330 may range from about 5 degrees to about 7 degrees and the outer angular orientation 332 may equal about 0 degrees, with respect to the longitudinal axis L. Reference to "about" concerning the above length and angular ranges is intended to encompass +/−20% of the nominal value.

Figure 4:
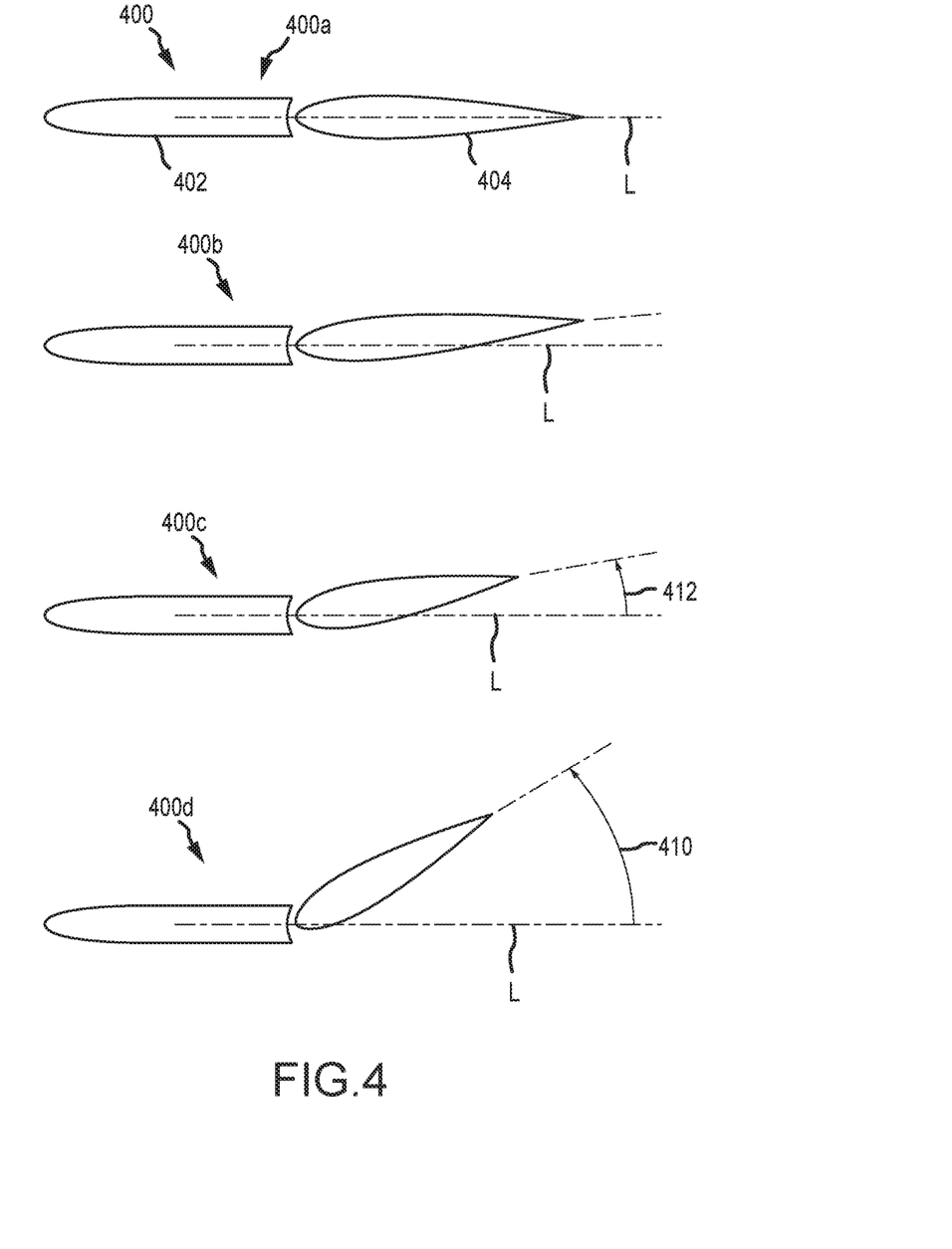
FIG. 4 provides cross sectional views of an inlet guide vane at several radial locations, according to various embodiments.

Referring now to FIG. 4, cross sections of several radial locations of an inlet guide vane 400, similar to the fan inlet guide vane 300 illustrated in FIG. 3, are shown, according to various embodiments. First 400a, second 400b, third 400c and fourth 400d cross sections are taken at radial locations equal to about 90%, 80%, 50% and 20% of $R_{IGV}$, respectively. In various embodiments, the first cross section 400a and the second cross section 400b may be located within a radially outer portion of the inlet guide vane 400, the third cross section 400c may be located within a transition portion of the inlet guide vane 400 and the fourth cross section 400d may be located within a radially inner portion of the inlet guide vane 400, with the radially inner, radially outer and transition portions being similar to those referenced above with respect to FIG. 3.

The inlet guide vane 400 includes a strut 402 and a flap 404. In various embodiments, a longitudinal axis L extends through the strut 402 toward an aft end of the inlet guide vane 400. Referring to the first cross section 400a and the second cross section 400b, the flap 404 is shown in both cross sections having angular orientations equal to about 0 degrees and to about 5 degrees, respectively, with respect to the longitudinal axis L. Referring to the fourth cross section 400d, the flap 404 is shown having an angular orientation 410 equal to about 30 degrees with respect to the longitudinal axis L. Referring to the third cross section 400c, the flap is shown having an angular orientation 412 equal to about 10 degrees with respect to the longitudinal axis L. In various embodiments, the first cross section 400a and the second cross section 400b may be characterized as representing a radially outer portion of the inlet guide vane 400 being in a closed (or less open) position, while the fourth cross section 400d may be characterized as representing a radially inner portion of the inlet guide vane 400 being in an open (or more open) position, the more or less open positions being with respect to inner and outer portions, respectively, or the longitudinal axis L, as described above.

Figure 5:
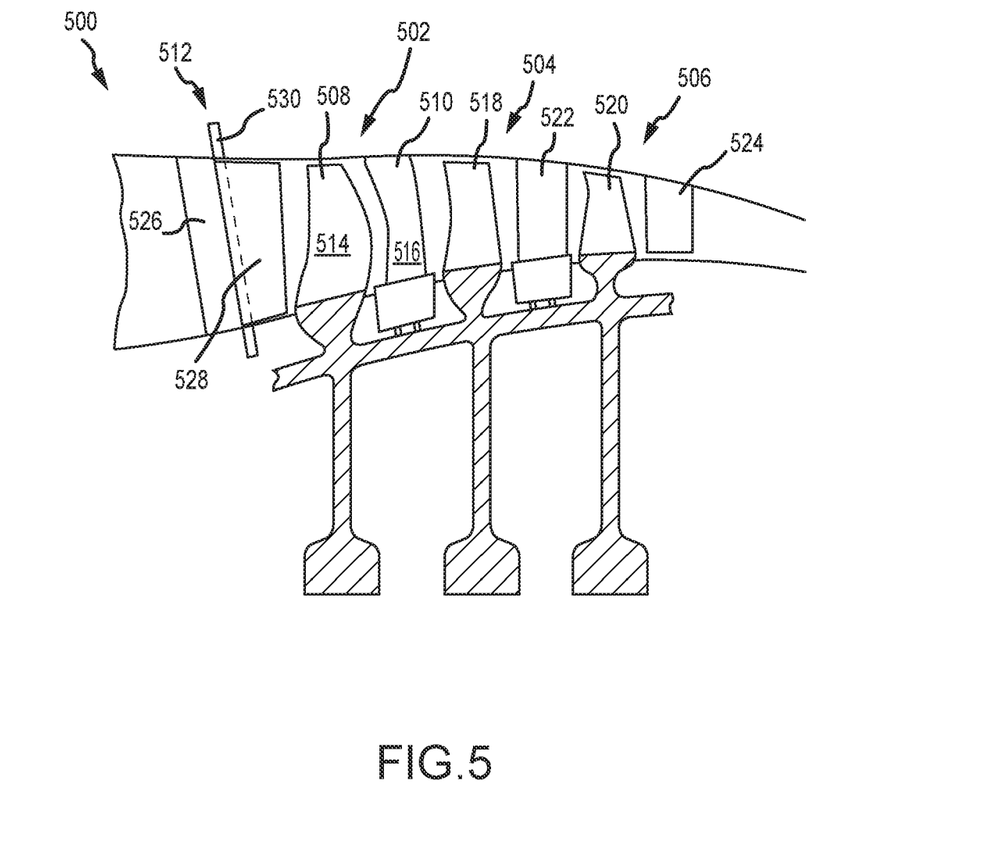
FIG. 5 provides a schematic view of multiple-stage fan section of a gas turbine engine, according to various embodiments.

Referring now to FIG. 5, a schematic view of a fan section 500 of a gas turbine engine is shown. Similar to the discussion above, the fan section 500 may be referred to as a three-stage fan, as it includes a first fan stage 502, a second fan stage 504 and a third fan stage 506, each having a rotor and a corresponding stator. For example, the first fan stage 502 includes a first rotor 508 and a first stator 510. The fan section 500 further includes a fan inlet guide vane 512 that conditions the airflow prior to receipt by the first fan stage 502. The first rotor 508 includes a plurality of fan blades 514 while the first stator includes a plurality of vanes 516. The first rotor 508, a second rotor 518 and a third rotor 520 are designed to rotate about a central axis. The corresponding first stator 510, second stator 522 and third stator 524, along with the fan inlet guide vane 512, remain stationary relative to the central axis.

In various embodiments, the fan inlet guide vane 512 includes a strut 526 and a flap 528. The flap 528 pivots about a shaft 530 or similar mechanism. Similar to the discussion above, the flap 528 may pivot in a first direction to increase the supply of air leading to the first rotor 508 or may pivot in a second, or opposite, direction to decrease the supply of air leading to the first rotor 508. In various embodiments, the flap 528 includes the characteristics of the flaps described above with reference to FIGS. 3 and 4, including radially inner, radially outer and transition portions, which facilitates further control over the air supply entering the first rotor over merely pivoting the flap in the first or second direction. The further control, as described above, facilitates a reduction or elimination of shock wave formation, particularly in the radially outer portions of the fan blades 514 where the relative air velocities tend to be greatest.

While FIG. 5 references a multiple-stage fan section, it will be appreciated that the principles and embodiments described above are also applicable to other sections of a gas turbine engine. For example, similar embodiments to that shown in FIG. 5 are applicable to one or more stages of a low pressure compressor or a high pressure compressor or both. Further, the disclosure is not limited to inlet guide vanes for use with fans or compressors as the same principles may be applied to separate stator stages throughout a gas turbine engine. As illustrated in FIG. 1, for example, each of the rotors in the fan section and the compressor section is associated with a stator comprising a plurality of vanes circumferentially spaced about the stator. The disclosure contemplates that one or more or all the vanes in any stator section may comprise either a flap or a strut and flap combination having radially inner, radially outer and transition portions configured to selectively reduce or increase the flow of air into the blades of a downstream rotor. Thus, in various embodiments, all the vanes throughout both the fan section and the compressor sections may include flaps or strut and flap combinations having radially inner, radially outer and transition portions configured to selectively reduce or increase the flow of air into all the corresponding blades of the downstream rotors consistent with the principles described above.

Figure 6:
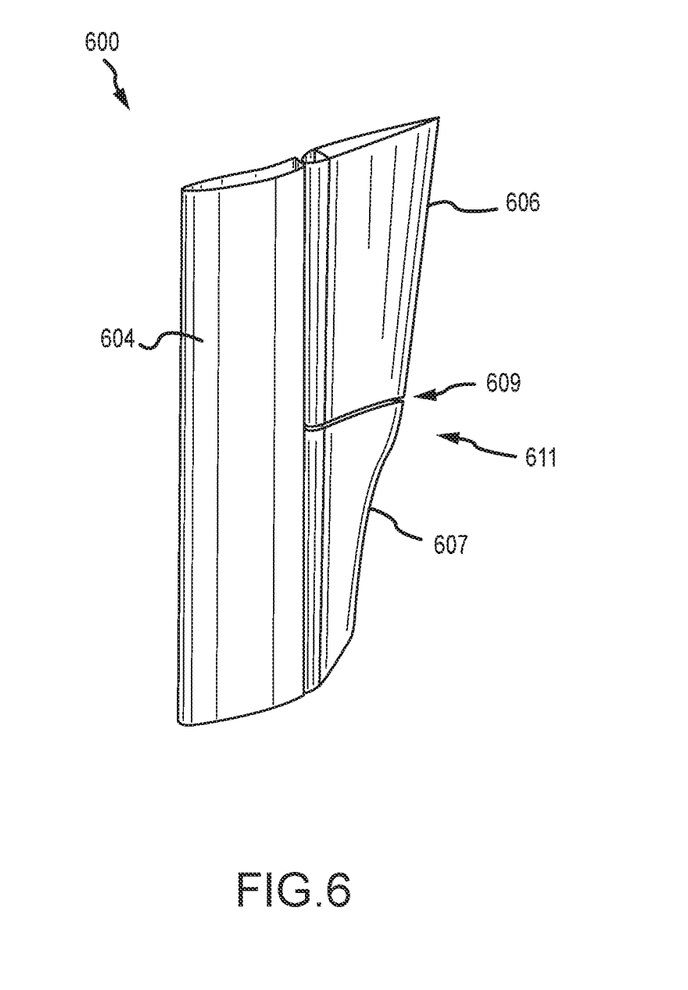
FIG. 6 provides a schematic view of a fan inlet guide vane, according to various embodiments.

Referring now to FIG. 6, a fan inlet guide vane 600 is illustrated according to various embodiments. In various embodiments, the fan inlet guide vane 600 includes a strut 604 and a radially outer flap 606 and a radially inner flap 607. The radially outer flap 606 is pivotally mounted to or adjacent the strut 604, which facilitates different configurations of the fan inlet guide vane 600 during different operational parameters, such as engine speed, for example. Similarly, the radially inner flap 607 is pivotally mounted to or adjacent the strut 604, which facilitates different configurations of the fan inlet guide vane 600 during different operational parameters, such as engine speed, for example. In various embodiments, the radially outer flap 606 and the radially inner flap 607 are configured to move or pivot in unison as a unitary member with respect to an oncoming air flow or to move or pivot independently with respect to the oncoming air flow. In various embodiments, a split 609 between the radially outer flap 606 and the radially inner flap 607 may be positioned at or proximate a transition region 611 of the fan inlet guide vane 600. The split 609 enables fine adjustments to the shape or configuration of the fan inlet guide vane 600 to be made in response to operating conditions. In various embodiments, for example, the radially outer flap 606 and the radially inner flap 607 may be moved or pivoted in unison in the same fashion as the fan inlet guide vane 300, referred to in FIG. 3, may be moved or pivoted. To fine tune operation of a compressor section of a gas turbine engine, for example, one or both of the radially outer flap 606 and the radially inner flap 607 may be moved or pivoted out of unison with the other to provide a more optimal flow of air into a downstream rotor, such as a rotor having a plurality of fan blades 302, as illustrated in and described with reference to FIG. 3.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. An inlet guide vane, comprising:
a strut and
a flap having a radial length in a radial direction, the flap comprising
a radially inner portion having a first angular orientation with respect to the strut,
a radially outer portion having a second angular orientation with respect to the strut, and
a transition portion intermediate the radially inner portion and the radially outer portion, where the first angular orientation transitions to the second angular orientation along a portion of the radial length,
wherein the flap comprises a radially outer flap and a radially inner flap separated by a split and wherein the radially outer flap is configured to pivot with respect to the strut independent from the radially inner flap.

2. The inlet guide vane of claim 1, wherein the radially inner portion has a radially inner length in the radial direction ranging from 20% to 50% of the radial length of the flap.

3. The inlet guide vane of claim 2, wherein the radially outer portion has a radially outer length in the radial direction ranging from 20% to 50% of the radial length of the flap.

4. The inlet guide vane of claim 3, wherein the transition portion has a transition length in the radial direction ranging from 5% to 30% of the radial length of the flap.

5. The inlet guide vane of claim 4, wherein the inlet guide vane includes a longitudinal reference and wherein the first angular orientation defines an angle ranging from 0 degrees to 45 degrees with respect to the longitudinal reference.

6. The inlet guide vane of claim 5, wherein the second angular orientation defines an angle ranging from 0 degrees to 45 degrees with respect to the longitudinal reference.

7. The inlet guide vane of claim 6, wherein the first angular orientation defines an angle ranging from 10 degrees to 20 degrees with respect to the longitudinal reference and wherein the second angular orientation defines an angle ranging from 0 degrees to 10 degrees with respect to the longitudinal reference.

8. The inlet guide vane of claim 6, wherein the first angular orientation is defined as an average angle of attack of an inner chord along the radially inner length with respect to the longitudinal reference and wherein the second angular orientation is defined as an average angle of attack of an outer chord along the radially outer length with respect to the longitudinal reference.

9. A fan section of a gas turbine engine, comprising:
a first rotor having a plurality of rotor blades;
a first stator having a plurality of vanes and positioned downstream of the first rotor; and
a fan inlet guide vane positioned upstream of the first rotor, the fan inlet guide vane comprising:
a strut and
a flap having a radial length in a radial direction, the flap comprising
a radially inner portion having a first angular orientation with respect to the strut,
a radially outer portion having a second angular orientation with respect to the strut, and
a transition portion intermediate the radially inner portion and the radially outer portion, where the first angular orientation transitions to the second angular orientation along a portion of the radial length,
wherein the flap comprises a radially outer flap and a radially inner flap separated by a split and wherein the radially outer flap is configured to pivot with respect to the strut independent from the radially inner flap.

10. The fan section of claim 9, wherein the radially inner portion has a radially inner length in the radial direction ranging from 20% to 50% of the radial length of the flap.

11. The fan section of claim 10, wherein the radially outer portion has a radially outer length in the radial direction ranging from 20% to 50% of the radial length of the flap.

12. The fan section of claim 11, wherein the transition portion has a transition length in the radial direction ranging from 5% to 30% of the radial length of the flap.

13. The fan section of claim 12, wherein the fan inlet guide vane includes a longitudinal reference, wherein the first angular orientation defines an angle ranging from 10 degrees to 20 degrees with respect to the longitudinal reference and wherein the second angular orientation defines an angle ranging from 0 degrees to 10 degrees with respect to the longitudinal reference.

14. The fan section of claim 13, wherein the first angular orientation is defined as an average angle of attack of an inner chord along the radially inner length with respect to the longitudinal reference and wherein the second angular orientation is defined as an average angle of attack of an outer chord along the radially outer length with respect to the longitudinal reference.

15. The fan section of claim 9, further comprising:
a second rotor having a second plurality of rotor blades and positioned downstream of the first stator; and a second stator having a second plurality of vanes and positioned downstream of the second rotor.

16. The fan section of claim 15, wherein the first stator comprises: a second fan inlet guide vane, comprising: a second strut and a second flap having a radial length in the radial direction, the second flap comprising a radially inner portion having a first angular orientation with respect to the second strut, a radially outer portion having a second angular orientation with respect to the second strut, and a transition portion intermediate the radially inner portion and the radially outer portion, where the first angular orientation transitions to the second angular orientation along a portion of the radial length.

17. A gas turbine engine, comprising:
a fan section having
 a first fan rotor having a plurality of rotor blades;
 a first fan stator having a plurality of vanes and positioned downstream of the first fan rotor; and
 a fan inlet guide vane positioned upstream of the first fan rotor, the fan inlet guide vane comprising:
  a strut and
  a flap having a radial length in a radial direction, the flap comprising
   a radially inner portion having a first angular orientation with respect to the strut,
   a radially outer portion having a second angular orientation with respect to the strut, and
  a transition portion intermediate the radially inner portion and the radially outer portion,
   where the first angular orientation transitions to the second angular orientation along a portion of the radial length,
   wherein the flap comprises a radially outer flap and a radially inner flap separated by a split and wherein the radially outer flap is configured to pivot with respect to the strut independent from the radially inner flap; and
a compressor section having
 a first compressor rotor having a plurality of rotor blades;
 a first compressor stator having a plurality of vanes and positioned downstream of the first compressor rotor; and
 a compressor inlet guide vane positioned upstream of the first compressor rotor, the compressor inlet guide vane comprising:
  a second strut and
  a second flap having a radial length in the radial direction, the second flap comprising
   a radially inner portion having a first angular orientation with respect to the second strut,
   a radially outer portion having a second angular orientation with respect to the second strut, and
   a transition portion intermediate the radially inner portion and the radially outer portion, where the first angular orientation transitions to the second angular orientation along a portion of the radial length.

18. The gas turbine engine of claim 17, wherein the fan inlet guide vane includes a fan longitudinal reference, wherein the first angular orientation of the fan inlet guide vane defines an angle ranging from 10 degrees to 20 degrees with respect to the fan longitudinal reference and wherein the second angular orientation of the fan inlet guide vane defines an angle ranging from 0 degrees to 10 degrees with respect to the fan longitudinal reference.

19. The gas turbine engine of claim 18, wherein the compressor inlet guide vane includes a compressor longitudinal reference, wherein the first angular orientation of the compressor inlet guide vane defines an angle ranging from 10 degrees to 20 degrees with respect to the compressor longitudinal reference and wherein the second angular orientation of the compressor inlet guide vane defines an angle ranging from 0 degrees to 10 degrees with respect to the compressor longitudinal reference.

* * * * *